United States Patent [19]

Goldsholl

[11] 4,239,380
[45] Dec. 16, 1980

[54] IMAGE PROCESSING APPARATUS AND METHODS

[76] Inventor: Morton Goldsholl, c/o Goldsholl Associates, 402 Frontage Rd., Northfield, Ill. 60093

[21] Appl. No.: 10,514

[22] Filed: Feb. 9, 1979

[51] Int. Cl.³ ..................... G03B 41/00; G03B 27/68; G03B 27/32
[52] U.S. Cl. .................................. 355/52; 354/118; 355/77
[58] Field of Search ........... 355/80, 81, 44, 46, 355/52, 54, 64, 18, 77, 1, 71; 354/118, 291

[56] References Cited

U.S. PATENT DOCUMENTS

| | | | |
|---|---|---|---|
| 89,342 | 4/1869 | Rawson | 354/118 |
| 373,404 | 11/1887 | Hulbert | 354/118 |
| 1,793,698 | 2/1931 | Jones | 355/46 |
| 1,812,448 | 6/1931 | Reilly et al. | 355/80 |
| 1,944,111 | 1/1934 | Schieren | 355/52 |
| 1,955,170 | 4/1934 | Bornmann | 355/44 |
| 2,669,354 | 2/1954 | Perrin | 355/1 X |
| 2,843,664 | 7/1958 | Olin | 355/1 X |
| 2,985,086 | 5/1961 | Craig | 355/77 |
| 3,016,785 | 1/1962 | Kapany | 355/1 X |
| 3,171,340 | 3/1965 | Mawey | 355/81 X |
| 3,181,987 | 5/1965 | Polevitzky | 355/77 X |
| 3,374,724 | 3/1968 | Torres | 355/52 X |
| 3,479,119 | 11/1969 | Miller et al. | 355/80 |
| 3,503,315 | 3/1970 | De Montebello | 355/77 |
| 3,564,133 | 2/1971 | Hobrough | 355/52 X |
| 3,588,514 | 6/1971 | Simpkins | 355/1 X |
| 3,609,233 | 9/1971 | Nagao | 355/1 X |
| 3,676,000 | 7/1972 | Mayer et al. | 355/52 |
| 3,722,998 | 3/1973 | Morse | 355/71 |
| 3,726,998 | 4/1973 | Szpak et al. | 355/1 X |
| 3,743,415 | 7/1973 | Gilman | 355/52 |
| 3,745,037 | 7/1973 | Bowker | 117/37 R |
| 3,749,489 | 7/1973 | Parrent | 355/52 |
| 3,824,336 | 7/1974 | Gould et al. | 355/52 X |
| 3,912,510 | 10/1975 | Marks | 96/1 R |
| 3,926,520 | 12/1975 | Kaufman | 355/80 |
| 3,984,187 | 10/1976 | Bestenreiner et al. | 355/80 |
| 4,015,115 | 3/1977 | Corcoran | 250/199 |
| 4,015,903 | 4/1977 | Zimmet et al. | 355/52 X |
| 4,050,808 | 9/1977 | Gyori et al. | 355/77 X |

FOREIGN PATENT DOCUMENTS

| | | | |
|---|---|---|---|
| 944 | of 1915 | United Kingdom | 355/46 |
| 564532 | 10/1944 | United Kingdom | 354/291 |

OTHER PUBLICATIONS

Watson-Manning Inc., Stratford, Connecticut, Blocpix Advertisement.
Scientific American, Nov. 1973, The Recognition of Faces, pp. 72 to 82.

*Primary Examiner*—Donald A. Griffin
*Attorney, Agent, or Firm*—Neuman, Williams, Anderson & Olson

[57] ABSTRACT

A primary image is processed by an array of optical elements to produce artistic effects in a resultant image which is divided into contiguous modular portions and which is recorded for use in various media including prints, still and motion pictures and patterns for embroidery, petit point and other handicraft applications. The optical elements may be in the form of lenses of square or other shapes positioned at a certain spacing distance from a primary image plane. The spacing distance is adjustable to produce desired effects and the size of the primary image is adjustable to control the size of the modular portions in relation to the size of the resultant image. When the desired resultant image is produced, it or a selected portion thereof is recorded by a camera.

14 Claims, 8 Drawing Figures

U.S. Patent      Dec. 16, 1980      4,239,380
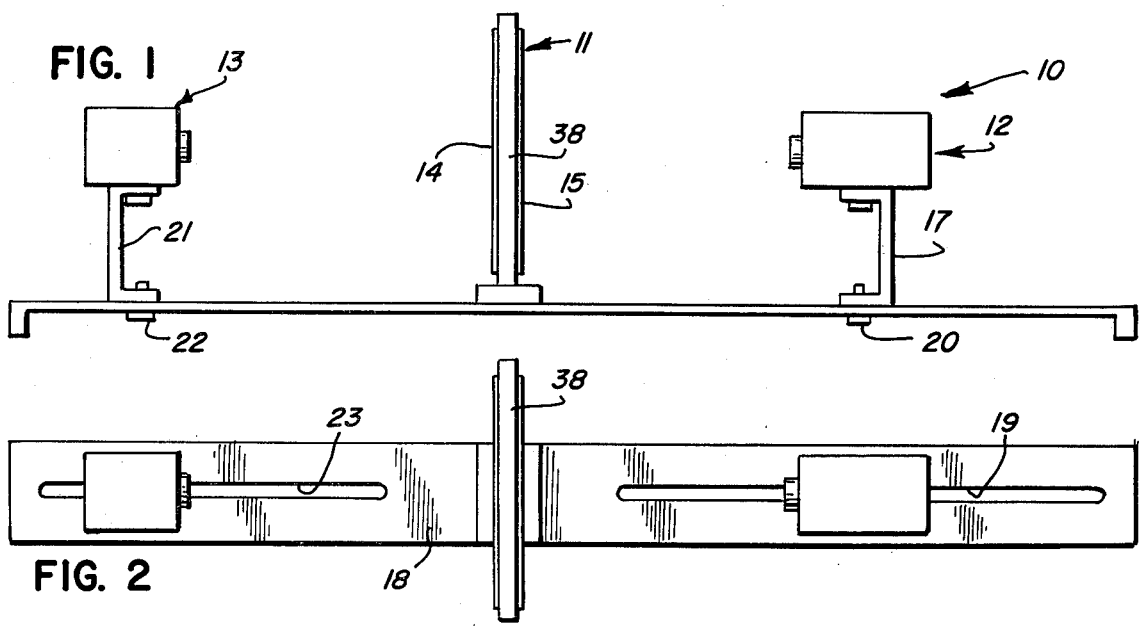
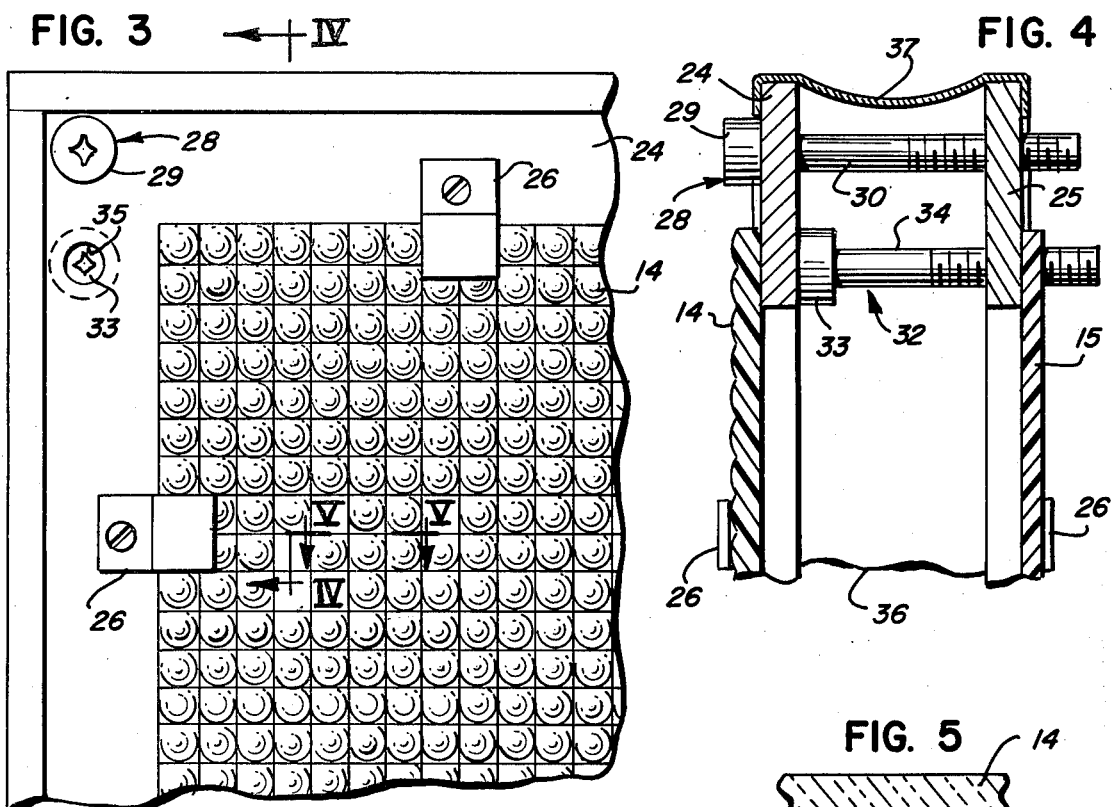
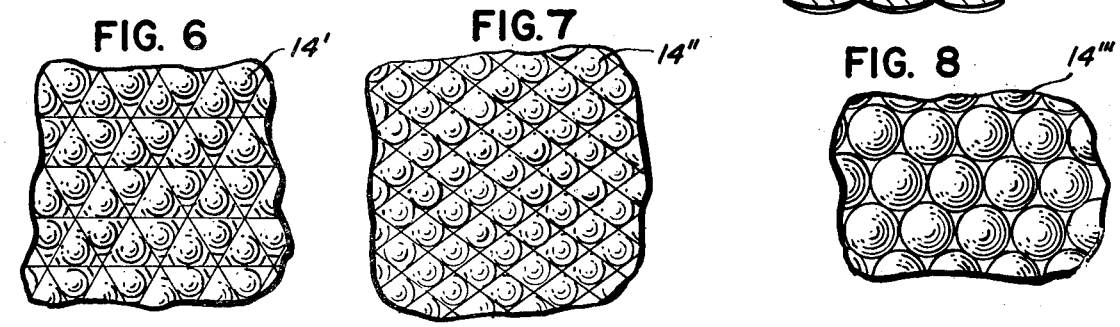

IMAGE PROCESSING APPARATUS AND METHODS

This invention relates to the processing of images for creating artistic renditions thereof and more particularly to methods and apparatus by which a variety of attractive and distinctive visual effects can be easily and quickly produced and accurately controlled by an artist. The invention is usable to create patterns for embroidery, petit point and similar handicraft uses, to create still and motion pictures, for printing and graphic arts and for a variety of other applications.

BACKGROUND OF THE PRIOR ART

Arrangements have heretofore been used or proposed for assisting an artist in creating various types of designs. Many of such arrangements have been highly effective in some applications but as to others, they either have been incapable of producing certain visual effects or have been such that they would require an artist to spend a great deal of time before obtaining such visual effects. Electronic and computer techniques might theoretically be used to develop any desired type of design, but they are difficult, time-consuming and expensive to apply in practice and are usable effectively only in specialized cases.

SUMMARY OF THE INVENTION

This invention was evolved with the general object of overcoming disadvantages of prior art arrangements and providing methods and apparatus with which certain distinctive types of visual effects can be easily and quickly produced and readily controlled to obtain optimum results.

In accordance with this invention, a primary picture or image to be processed is provided or developed at a certain primary plane and an array of optical elements is disposed adjacent the primary plane to develop a resultant image which is divided into contiguous modular portions, each modular portion being produced by one of the optical elements from a portion of the primary picture or image aligned therewith.

Preferably, each of the modular portions has a generally uniform hue and intensity. As a result, a sharp line of demarcation is produced at the boundary between contiguous portions in the resultant image when there is a substantial difference between the intensity and/or hue of the corresponding portions of the primary picture image. Thus, pictures or images in which there is a continuous and gradual change can be converted into a resultant image having sharply defined changes. In addition, the modular portions can be of a certain distinctive shape and can be arranged in a certain distinctive pattern, determined by the shape and arrangement of the optical elements. The effect can be very pronounced and quite pleasing, attractive and distinctive. Portraits are generally a very good subject for use with the invention, but almost any type of primary picture or image can be used.

The optical elements may be so constructed and arranged as to produce modular portions of square shape arranged in a regular row-column format. Triangular, hexagonal and other polygonal shapes can also be used and it is desirable in many applications that each side of each modular portion be contiguous to a side of an adjacent modular portion, avoiding gaps in the resultant image. It is, however, possible to use circular or other shapes and the shapes can also be irregular as well as a mixture of more than one type of regular shape. However, a regular pattern is desirable for certain applications and especially for producing patterns for needle-point or petit point or other embroidery type handicraft applications, where a canvas or other base material is used which has a mesh structure providing a regular modular pattern.

In accordance with an important feature, optical means are provided for so producing an image at the primary plane that its size can be adjusted to thereby control the size of the modular portions in relation to the over-all size of the resultant image. This feature is highly advantageous. In some cases, the artist will find that the effect he desires will be obtained only when the size of the modular portions is quite large in relation to that of the resultant image. In others, the desired effect will be obtained only with very small modular portions. It is also found that regardless of whether the modular portions are of small, large or intermediate size in relation to the overall size of the image, a small change in the relative size of the modular portion can sometimes result in a very significant change in appearance. With the adjustability feature and by providing a great many optical elements producing relatively small modular portions, the range of effects which can be produced is very wide.

In accordance with specific features of the invention, light diffusion means are provided in the primary image plane, preferably in the form of a plate of an opal glass or plastic or of ground glass, and projecting means are provided for projecting a primary image to the light diffusion means for processing by the array of optical elements. The primary image projection means are adjustable relative to the light diffusion means to adjust the size of the primary image. Thus, a projector with a standard lens may be adjustably movable toward and away from the primary image plane or a projector having a zoom-type lens may be used.

The resultant image might conceivably be recorded by providing a film, photo-sensitive paper or other recording medium adjacent to the array of optical elements, but preferably, camera means are disposed in spaced relation in array to the optical elements for recording the resultant image. By adjustment of the position of the camera means or through adjustment of a zoom-type lens thereof, the effective size of the recorded portion of the resultant image may be adjusted.

In accordance with another specific feature, the projection and camera means may respectively be in the form of a motion picture projector and the motion picture camera which may be operated together, preferably in synchronism. Thus, the special modularizing effects may be readily obtained with motion as well as still pictures. During processing of a motion picture in this way, the same identical conditions may be maintained or, if desired, the projector and/or the camera may be shifted in position or adjusted during the re-filming and processing operation to obtain additional effects.

Important specific features of the invention relate to the construction of an image processor unit in which the modularizing optical elements preferably comprise lens elements having substantially the same focal length with a spacing distance from the primary image plane which is approximately equal to the focal length.

The lens elements may be circular or may be of polygonal shape, preferably with each side of each element being contiguous to a side of an adjacent element to avoid any gaps in the resultant image. Square, quadrangular or other shapes which may be arranged in a row-column format are preferred for certain applications and especially when the apparatus and method of the invention are used to create patterns for handicraft applications such as for embroidery wherein the base of the material is typically canvas or other fabric having a modular mesh configuration. By relating the size, shape and format of the modular portions of the image process or to the modular portions of the fabric forming the base material, the required pattern can be easily and quickly produced.

The apparatus and method of the invention thus allows matching of the color of each area of an image with either thread or paint or even a mosaic material. It also allows a small module of color to be increased in size to any desired degree. Thus the module will always remain a square module and the craftsman can select whether to make the module ½ inch, 1 inch or 10 inches. The only criteria required to be judged will be the match to fabric or paint.

An important aspect of the invention is it makes it possible to create portraits of people with various media, allowing even untrained amateurs to acquire a pattern which is developed from processing a given slide or photo.

This invention contemplates other objects, features and advantages which will become more fully apparent from the following detailed description taken in conjunction with the accompanying drawings.

BRIEF DESCRIPTION OF THE DRAWINGS

FIG. 1 is a side elevational view of image processing apparatus constructed in accordance with the invention;

FIG. 2 is a top plan view of the image processing apparatus of FIG. 1;

FIG. 3 is an elevational view on an enlarged scale of a corner portion of an image processor unit of the apparatus of FIGS. 1 and 2;

FIG. 4 is a sectional view taken substantially along line IV—IV of FIG. 3;

FIG. 5 is a sectional view on a further enlarged scale, showing how one lens element is formed in accordance with the invention;

FIG. 6 illustrates how modular portions may have a triangular rather than a square shape;

FIG. 7 illustrates how modular portions may have a diamond rather than a square or triangular shape; and FIG. 8 illustrates how modular portions may have a circular rather than a square, triangular or diamond shape.

DESCRIPTION OF THE PREFERRED EMBODIMENT

Reference numeral 10 generally designates image processing apparatus constructed in accordance with the principles of this invention and designed to record images on film or paper for reproduction as still or motion pictures, for production of engravings for printing presses, for production of patterns for various handicraft uses and forms or for other purposes.

In the apparatus 10 as diagrammatically illustrated, an image processor unit 11 is provided between a projector 12 and a camera 13. In one mode of operation of the apparatus 10, an image from a film transparency is projected to a primary image plane at one face of the processor unit 11. The unit 11, which includes an array of optical elements, produces at its opposite face a resultant image divided into contiguous square modular portions in a regular row-column format each being formed by a portion of the primary image aligned with one of the optical elements.

The relative size of the modular portions is adjustable. The operator may adjust the projector 12 and its relationship to the unit 11 to obtain the desired size of the primary image and to thereby control the size of the resultant image and the relation of the size of the resultant image to the size of the modular portions. Also, the operator may adjust the processor unit 11 to vary the effect produced by each optical element.

Such adjustments can be made easily and quickly and they can be made while observing the appearance of the resultant image so that the desired results can be readily and accurately obtained. When a desired appearance is obtained, the operator may then use the camera 13 to record the resultant image, or a selected portion thereof, adjusting the camera and its relation to the processor unit 11 as required.

After developing the film, it may be used for one or more of a variety of purposes as above indicated. It is noted that once the desired adjustments are ascertained, a series of primary images may be processed in an identical manner. In this connection, the projector 12 may be a motion picture projector and the camera 13 may be a motion picture camera. Film is generally preferable for most applications, but other media might be used. For example, magnetic tape may be used in conjunction with television equipment, if desired.

Referring to FIGS. 3-5, the image processor unit 11 comprises a plate 14 of a transparent material which is formed to provide an array of optical elements in the form of square lenses in a row-column format. The processor unit 11 further includes a second plate 15 in spaced parallel relation to the plate 14, plate 15 being of an opal glass or plastic material, or being of ground glass or otherwise providing a light-diffusing means in substantially one plane. In this way the image projected by the projector 12 is developed at a primary image plane.

In the illustrated construction, one face of the plate 14 is planar and the opposite face thereof is formed into contiguous square surface portions in a regular row-column format, each such surface portion being a frustal-spherical convex surface having a certain radius of curvature and being operative to form a lens having a certain focal length. Thus, an array of plano-convex lens elements is formed. It will be understood, however, that other forms of lenses may be used.

When the spacing between the lens plate 14 and the primary image plate 15 has a certain value which is somewhat different from the focal length of the lens elements so formed by the lens plate 14, each of the modular portions of the resultant image will have a substantially uniform intensity and hue corresponding to the portion of the primary image aligned therewith. An averaging of the tone occurs due to a slight spreading effect at an out of focus point. The optimum distance is relatively close but different from the focal length. For example, when the focus is at about ¾ inches, the optimum effect may be produced with a focal length of ⅝ inches.

As a result of the averaging effect, when there is a substantial difference between the intensity and/or hue of portions of the primary image aligned with adjacent lens portions, there is a sharp line of demarcation at the boundary between contiguous portions in the resultant image. Images in which there is a continuous and gradual change are converted into a resultant image having sharply defined changes. Lines or boundaries in the primary image are converted into lines or boundaries which extend in accordance with the form of the modular portions. The overall effect is very pronounced and distinctive and with proper adjustment the effect is very pleasing and attractive.

To allow production of a very wide range of effects, it is desirable that there be a great many modular portions which are desirably of relatively small size in order to keep the overall size of the image processor unit within practical lengths. By way of illustrative example and not by way of limitation, the plate 14 may be formed with 3600 lens elements, formed in sixty rows and sixty columns.

An assembly problem might result if the lens elements were separately formed and then cemented or otherwise secured together. On the other hand, the mold and fabrication costs in attempting to form the elements in a single integral member might prove to be expensive. As a compromise, a plurality of plates may be formed each having a smaller number of elements, with such plates being cemented or otherwise secured together at their contiguous edges. For example, sixteen plates may be used each having 225 elements formed in a 15 row-15 column format, each element being a ¼ inch square. With an assembly of such plates, a plate is provided having an overall dimension of about 15 inches square.

To obtain a large number of modular portions in the resultant image developed by the processor unit 11, the projector 12 may be moved away from the unit 11 to cause the projected image to occupy substantially the entire area of the plate 15. For this purpose, the projector 12 is supported through a bracket 17 from a frame member 18 having a slot 19 through which the threaded shank of a locking screw 20 extends.

The camera 13 is supported from the frame member 18 in a similar fashion, through a bracket 21 and through a locking screw 22 having a threaded shank portion extending through another slot 23 in the frame member 18. By moving the camera 13 toward or away from the processor unit 11, the operator may control the portion of the resultant image which is selected for recording on the film.

It will be understood, of course, that the focus of the projector 12 and camera 13 may be adjusted when adjusting the positions thereof toward or away from the unit 11. Also, either or both may have zoom lenses to permit adjustment of the effective distance toward and away from the unit 11 without adjusting the actual distance. It is important in any case to provide for adjustment of the size of the resultant image relative to the size of the modular portions.

Another adjustment which is highly desirable is with respect to the distance between the lens element plate 14 and the plate-diffusion plate 15 in the primary image plane. As shown in FIGS. 3 and 4, peripheral portions of the plates 14 and 15 are secured to a pair of rectangular frame members 24 and 25, suitable clips 26 being used for this purpose. The frame members 24 and 25 are adjustably secured together in spaced relation through a pair of screws at each corner portion thereof. Thus, at the corner portion illustrated in FIGS. 3 and 4, a first screw 28 is provided having a head portion 29 on the outside of the plate 24 and having a shank portion 30 extending through the plate 24 and threaded into the plate 25. A second screw 32 is provided having a head portion 33 on the inside of the plate 24 and having a shank portion 34 which is also threaded through the plate 25. The head 33 is aligned with an opening 35 of smaller diameter for adjustment by means of a Philips screwdriver or other adjustment tool.

It will be understood that, with this arrangement, the spacing between the plates 14 and 15 may be readily and accurately adjusted and controlled. Thus to decrease the spacing, the screw 32 may be rotated to move the head 33 toward the plate 25 and then the screw 28 may be adjusted to tightly engage the plate 24 with the head 33 of the screw 32.

Tapes 36, 37, and 38 of flexible material may be provided between the outer side and upper edges of the frame members 24 and 25, as illustrated.

In the embodiment illustrated in FIGS. 3 and 4, modular portions of the square shape are produced but it will be understood that other shapes may be used. Thus FIG. 6 shows a modified plate 14' having lens portions of triangular shape, FIG. 7 shows another modified plate 14'' having lens portions of the diamond shape and FIG. 8 shows still another modified plate 14''' having lens portions of circular shape. Still other shapes may be used and it is also quite possible to use irregular shapes as well as a mixture of different regular shapes. It is noted that using a triangular or square, diamond-shaped or other quadrangular shape, each side of each modular portion may be contiguous to a side of an adjacent modular portion avoiding open gaps such as those obtained with a circular shape as shown in FIG. 8 or such as may be obtained with polygonal shapes of various types. In general, it is desirable to use shapes and formats which avoid such gaps, but it all depends, of course, upon the desires of the artist.

I claim:

1. Image processing apparatus comprising: means defining a primary image plane from which light of non-uniform hue and intensity emanates so as to define a primary image, and an array of optical elements disposed in side-by-side relation to each other and in closely adjacent relation to said primary image plane and arranged to develop from a primary image a resultant image divided into contiguous modular portions each being produced by one of said optical elements from a portion of a primary image which is aligned therewith and which is substantially separate from the portions aligned with adjacent optical elements.

2. In an image processing apparatus as defined in claim 1 wherein the portion of the primary image aligned with each optical element may be of non-uniform hue and intensity, each of said optical elements being effective to produce a modular portion of said resultant image which is of generally uniform hue and intensity.

3. In an image processing apparatus as defined in claim 1, means for adjusting the size of said resultant image in relation to the size of said modular portions.

4. In an image processing apparatus as defined in claim 1, light diffusion means in said primary image plane, and primary image projecting means for projecting a primary image to said light diffusion means to be processed by said array of optical elements.

5. In an image processing apparatus as defined in claim 4, said primary image projection means being adjustable in relation to said light diffusion means to adjust the size of said primary image and to thereby adjust the size of said resultant image in relation to the size of said modular portions.

6. In an image processing apparatus as defined in claim 1, camera means in spaced relation to said array of optical elements for recording said resultant image.

7. In an image processing apparatus as defined in claim 6, said camera means including a motion picture camera.

8. In an image processing apparatus as defined in claim 7, means including motion picture projection means for producing primary images at said primary image plane.

9. In an image processing apparatus as defined in claim 1, each of said optical elements being in the form of a lens element.

10. In an image processing apparatus as defined in claim 9, said lens elements having substantially the same focal length and being spaced a distance from said primary image plane of on the order of said focal length.

11. In an image processing apparatus as defined in claim 9, said lens elements being of polygonal shape with each side of each element being contiguous to a side of an adjacent element.

12. In an image processing apparatus as defined in claim 9, means for adjusting the distance between said lens elements and said primary image plane.

13. In a method of image processing, the steps of developing in a primary image plane a primary image defined by emanating light of non-uniform hue and intensity, providing an array of optical elements in side-by-side relation and in adjacent relation to said primary image plane to develop from said primary image a resultant image divided into contiguous modular portions each being produced by one of said optical elements from a portion of the primary image aligned therewith, and recording said resultant image.

14. In a method as defined in claim 13 for creating a pattern for use in embroidery or the like with stitches having a certain base dimension, the steps of adjusting the size of the primary image in relation to the size of the optical elements and adjusting the size of the recorded resultant image in relation to the resultant image as produced by the array of optical elements to produce a modular size equal to an integer multiple of the base stitch dimension.

* * * * *